US005472785A

United States Patent [19]
Stobbie, IV et al.

[11] Patent Number: 5,472,785
[45] Date of Patent: Dec. 5, 1995

[54] REACTIVE WAX-CONTAINING MOISTURE CURABLE HOT MELT COMPOSITION

[75] Inventors: Charles W. Stobbie, IV, Woodbury; John C. Tangen, St. Paul, both of Minn.

[73] Assignee: Minnesota Mining and Manufacturing Company, St. Paul, Minn.

[21] Appl. No.: 226,699

[22] Filed: Apr. 12, 1994

[51] Int. Cl.$^6$ .................................................. C08L 75/06
[52] U.S. Cl. .................. 428/423.1; 525/130; 525/404; 525/411; 525/412; 525/440; 525/454; 525/455
[58] Field of Search .................................. 525/130, 404, 525/440, 411, 412, 454, 455; 428/423.1

[56] References Cited

U.S. PATENT DOCUMENTS

| | | | |
|---|---|---|---|
| 3,619,267 | 11/1971 | Weissermel et al. | 117/100 C |
| 3,931,077 | 1/1976 | Uchigaki et al. | 260/26 |
| 4,585,819 | 4/1986 | Reischle et al. | 524/196 |
| 4,808,255 | 2/1989 | Markeuka | 525/130 |
| 5,102,943 | 4/1992 | Logullo | 524/487 |
| 5,115,073 | 5/1992 | Meckel et al. | 528/83 |
| 5,173,538 | 12/1992 | Gilch et al. | 525/130 |
| 5,262,481 | 11/1993 | Jammet | 525/125 |

FOREIGN PATENT DOCUMENTS

| | | | |
|---|---|---|---|
| 0455400 | 4/1990 | European Pat. Off. | C08L 75/04 |
| 0465351 | 7/1991 | European Pat. Off. | C08G 18/54 |
| 0451352A2 | 10/1991 | European Pat. Off. | |
| 2137638 | 4/1983 | United Kingdom | C09J 3/16 |
| WO91/15530 | 10/1991 | WIPO | |

OTHER PUBLICATIONS

A-C®Polyethylene Functional Waxes For Hot Melt Adhesives by Lawrence Krutzel, a paper presented at the TAPPI Hot Melt Symposium, Jun. 1988.

*Primary Examiner*—Patricia A. Short
*Attorney, Agent, or Firm*—Gary L. Griswold; Walter N. Kirn; Steven E. Skolnick

[57] ABSTRACT

A moisture curable hot melt composition comprises:

(a) a first isocyanate-terminated polyurethane prepolymer that is the reaction product of a crystalline polyester polyol and a polyisocyanate;

(b) a crystalline, reactive wax; and (c) optionally, a second isocyanate-terminated polyurethane prepolymer that is the reaction product of a polyisocyanate and a hydroxy-functional polymer that is different than the crystalline polyester polyol.

28 Claims, No Drawings

REACTIVE WAX-CONTAINING MOISTURE CURABLE HOT MELT COMPOSITION

BACKGROUND OF THE INVENTION

1. Field of the Invention

This invention relates generally to a moisture curable hot melt composition and, more specifically, to a reactive wax-containing moisture curable hot melt composition that sets quickly.

2. Description of the Related Art

Hot melt compositions (e.g., adhesives, coatings and sealants) are a solid at room temperature, melt to a viscous liquid when heated to a moderate temperature, and are applied molten to an appropriate substrate. The molten composition then cools and solidifies to form a bond to the substrate. One important parameter in characterizing the performance of hot melt compositions is set time.

"Set time," as used herein and as described more fully below, refers to the time required for the hot melt composition to no longer permit repositionability once the composition has been applied. In a typical adhesive bonding operation, the adhesive is applied to the substrate and a second member is placed on the substrate to be bonded thereto by the hot melt composition. For a certain period of time after the hot melt composition has been applied, the second member may be moved, adjusted or repositioned. Once that period of time (i.e., the set time) elapses, the second member can no longer be repositioned.

Another important parameter in assessing the performance of hot melt compositions is the initial strength or "green strength" of a bond made therewith. Green strength, as explained more fully hereinbelow, is often measured by the ability of the bond to support a given weight for at least a certain time. Therefore, green strength and set time are frequently related since set time can be regarded as the time that must pass before the bond can support a given weight for a certain time.

In certain instances it is particularly desirable to employ a hot melt composition having a short set time; that is, a hot melt composition that rapidly achieves a certain green strength. One example is an automated assembly line. For instance, on an automated production line for motor vehicle lamp assemblies, lenses for the vehicle side lights and tail lights are typically adhesively bonded to lamp housings. The adhesive possesses a certain set time that permits the lens to be manually repositioned if it was not accurately mounted when first applied.

However, once the lens is properly positioned, the adhesive should set quickly and achieve a high green strength. Until the set time is exceeded and the green strength reached, the lens may be inadvertently jarred free and fall off the lamp housing as the lamp assembly progresses along the production line, unless the components are clamped together.

Current production methods allow for accurate placement of the lens on the lamp housing. Consequently, it is desirable to have a quick setting hot melt composition so that the speed of the assembly line and hence the number of completed units can be increased.

At least two distinct and readily differentiatable classes of hot melt compositions are recognized: conventional hot melt compositions and reactive or curing hot melt compositions. Conventional hot melt compositions typically comprise an ethylene/vinyl acetate copolymer, a tackifying resin, and a wax. Waxes are usually included to reduce the viscosity of the molten material. While conventional hot melt compositions are easily used, readily handled, and have excellent initial strength, they tend to form bonds having a low ultimate strength. Consequently, conventional hot melt compositions are most often used in applications requiring only low strength bonds such as bookbinding operations and the sealing of cardboard cases and cartons.

"A-C® Polyethylene Functional Waxes for Hot Melt Adhesives" (presented at the June, 1988 TAPPI Hot Melt Symposium) reports the use of functional waxes, such as oxidized polyethylene waxes, in ethylene/vinyl acetate and rubber block/copolymer hot melt adhesives. The functional waxes were incorporated into the hot melt adhesives as either partial or complete replacements for nonfunctional microcrystalline and paraffin waxes or as a partial replacement for the base copolymer. Reportedly, the functional waxes substantially increased adhesion to a wide variety of substrates while still dramatically reducing viscosity. Other benefits which are said to be derived from the use of functional waxes in these hot melt adhesives include faster set speeds.

European Patent Application No. 0,451,352 "Process to Produce Cationically Active Waxes," published Oct. 16, 1991 discloses, as an intermediate product, a wax (based on Fischer-Tropsch or polyethylene oxidates) carrying isocyanate groups. Reportedly the wax can be used in melt adhesives.

Reactive or curing hot melt compositions typically comprise an isocyanate-terminated polyurethane prepolymer (sometimes referred to as a polyurethane prepolymer or simply as a prepolymer). Once applied in a molten state to a substrate, these hot melt compositions cool and solidify to provide an initial bond strength and eventually react with ambient moisture (or moisture obtained from the substrate) in a curing reaction that results in a thermoset, high ultimate strength bond. While reactive hot melt compositions are known for their excellent final strength (i.e., after the moisture curing reaction), they are often regarded as suffering from slow set times and low initial strength.

U.S. Pat. No. 3,931,077 "Reactive Hot Melt Adhesive Composition And Method For Use Thereof," issued Jan. 6, 1976 to T. Uchigaki et al. discloses a reactive hot melt adhesive composition comprising 20 to 73 wt. % of a urethane prepolymer having terminal isocyanate groups, 2 to 25 wt. % of a thermoplastic resin (e.g., an ethylene/vinyl acetate copolymer, an ethylene/acrylic acid copolymer, an ethylene/acrylate copolymer, atactic polypropylene or a polyethylene terephthalate linear polymer), and 25 to 55 wt. % of a tackifier. The relative amounts of the different ingredients are apparently selected so as to provide a good balance of initial and ultimate strength properties. Reportedly, the hot melt compositions have a low viscosity at a relatively low temperature without requiring the addition of viscosity improving agents such as wax, which have been used in conventional hot melt adhesive compositions to decrease viscosity but with a concomitant decrease in adhesive strength.

U.S. Pat. No. 5,115,073 "Rapidly Crystallizing Polyurethane Systems," issued May 19, 1992 to W. Meckel et al. discloses a polyurethane system based on polyisocyanates and at least two polyesters having different melting points. These systems apparently rely on the presence of crystalline polyesters to enable the hot melt compositions to build up a certain strength immediately after application of the hot melt. Reportedly, the crystallization rate can be greatly accelerated by adding small quantities of a high melting polyester polyol (namely 2 to 30 parts by weight of a polyester diol having a melting point of 65° C. to 150° C. and a molecular weight of 600 to 8000) without the properties of these systems as a whole being adversely affected. Some of these polyester polyols can add significant cost to the manufacture of the hot melt composition.

U.S. Pat. No. 5,173,538, "Moisture-Curing, Polyurethane Hot-Melt Compositions," issued Dec. 22, 1992 to H. G. Gilch et al. This patent criticizes reactive polyurethane hot melt materials that set by crystallization for having a low initial peel strength immediately after bonding and a slow setting rate that depends on the crystallization rate of the polyesters. A quick setting, moisture curing, polyurethane hot melt adhesive composition based on polyether prepolymers is disclosed. One polyether based prepolymer has a glass transition point above room temperature and a second prepolymer (which may be based on a polyether, a polyester, or another hydroxyl-terminated polyol) has a glass transition point below room temperature. These compositions are believed to be based on the use of amorphous prepolymers rather than crystalline prepolymers.

International Patent Publication No. WO 91/15530 "Hot Melt Moisture-Cured Polyurethane Adhesive," published Oct. 17, 1991 includes a segmented thermoplastic polyether-polyester elastomer having both hard and soft segments. Reportedly, the use of this material enables the resulting moisture curable hot melt to achieve excellent green strength. While waxes are mentioned as an optional component, no distinction is made between different types of wax.

Consequently, there remains a need for an economical hot melt composition that sets quickly without adversely affecting other important properties such as the green strength or the ultimate strength of the bond. Such compositions would find considerable utility in a variety of applications, for example, the automated assembly procedure described above. In this instance, the lamp assembly production line could be operated more quickly because the hot melt composition would rapidly set to a high green strength. The risk that the lens would come loose, even at accelerated production rates, would be reduced.

SUMMARY OF THE INVENTION

This invention relates to moisture curable hot melt compositions useful as adhesives, coatings and sealants. The moisture curable hot melt compositions of the invention comprise, and more preferably, consist essentially of:

(a) a first isocyanate-terminated polyurethane prepolymer that is the reaction product of a polyisocyanate and a crystalline polyester polyol;

(b) a crystalline, reactive wax; and (c) optionally, a second isocyanate-terminated polyurethane prepolymer that is the reaction product of a polyisocyanate and a hydroxy-functional polymer that is different than the crystalline polyester polyol.

The crystalline polyester polyol preferably has a crystalline melting point of about 30° to 110° C. and, more preferably, about 40° to 100° C. The crystalline polyester polyol further and preferably has a number average molecular weight of about 800 to 8000, more preferably about 1500 to 6000.

Particularly useful crystalline polyester polyols comprise the reaction product of a linear, saturated, aliphatic diol having the structure $HO-(CH_2)_x-OH$ where the value of x is from 2 to 8, and a linear, saturated, aliphatic diacid having the structure $HOOC-(CH_2)_y-COOH$ where the value of y is from 1 to 12. Useful crystalline polyester polyols may also be derived from $\epsilon$-caprolactone.

A "reactive" wax refers to a wax that includes a moiety that is reactive with a principal component of the hot melt composition, including a polyurethane prepolymer, a polyisocyanate, and selected crystalline polyester polyols, or that is reactive with another constituent of the hot melt composition that itself is reactive with a principal component. Reactive moieties include hydroxyl, carboxyl, isocyanato, thiol, amino, epoxy and vinyl groups, although hydroxyl and carboxyl groups are preferred. Waxes useful in the invention should have a molecular weight of about 50 to 10,000, more preferably, about 400 to 1000. They should also be primarily hydrocarbon in nature; i.e., they should contain at least about 85% by weight hydrogen and carbon.

Surprisingly, it has been found that even very small amounts of such waxes may dramatically and unexpectedly reduce the set time of a hot melt composition made therewith. Preferably, the hot melt compositions of the invention comprise at least 0.005% by weight of the wax, based on the total weight of the hot melt composition, more preferably about 0.01 to 5% by weight, and most preferably about 0.05 to 1% by weight. Additionally, the reactive waxes used in the hot melt compositions of the invention are relatively low cost materials.

The hot melt compositions of the invention may optionally include one or more isocyanate-terminated polyurethane prepolymers derived from hydroxy-functional polymers other than the crystalline polyester polyol. Preferred hydroxy-functional polymers include polyether polyols such as polytetramethylene ether glycols, poly(oxypropylene) glycols, and ethylene oxide endcapped poly(oxypropylene) glycols. Such polyether polyols preferably have a molecular weight of about 500 to 3000.

In another aspect, the invention relates to a method for reducing the set time of a moisture curable hot melt composition that comprises a crystalline polyurethane prepolymer. The method comprises the step of adding to the hot melt composition an effective amount of a crystalline, reactive wax.

DETAILED DESCRIPTION OF THE PREFERRED EMBODIMENTS

This invention relates to moisture curable hot melt compositions useful as adhesives, coatings and sealants. By "hot melt" it is meant that the compositions are solid at room temperature but readily melt to a viscous liquid upon heating to moderate temperatures. Once it has been applied to a substrate, the molten, viscous hot melt composition cools and quickly sets (i.e., solidifies) by crystallization to provide a high initial strength or green strength bond. The compositions then further cure to a high ultimate or final strength by reacting with ambient moisture to provide a thermoset, infusible adhesive bond.

The moisture curable hot melt compositions of the invention comprise, and more preferably, consist essentially of (a) an isocyanate-terminated polyurethane prepolymer that is the reaction product of a polyisocyanate and a crystalline polyester polyol, and (b) a crystalline, reactive wax. Surprisingly and unexpectedly it has been found that even very small amounts of the wax will dramatically reduce the set time of the hot melt composition.

The isocyanate-terminated polyurethane prepolymer is sometimes referred to herein as a polyurethane prepolymer or as a prepolymer. The prepolymer is obtained by reacting a crystalline polyester polyol (which encompasses blends of more than one crystalline polyester polyol), and a polyisocyanate. By "crystalline" it is meant that the polyester polyol displays a crystalline melting point when measured by differential scanning calorimetry using a heating rate of 5° C. per minute. The peak temperature of the observed endotherm is taken as the crystalline melting point.

Crystalline polyester polyols preferred for use in the hot melt compositions of the invention should be solid at room temperature (about 20° to 22° C.) yet readily processable by conventional mixing equipment (such as a planetary mixer) at temperatures normally used for preparing such materials (about 100° C.). Accordingly, preferred polyester polyols for use in the hot melt compositions of the invention display a crystalline melting point of about 30° to 110° C., more preferably about 40° to 100° C. If the crystalline melting point is too low, it becomes more difficult to provide the polyester polyol as a solid at room temperature. If the crystalline melting temperature is too high, it is more difficult to process using conventional mixing equipment.

Preferred polyester polyols also have a number average molecular weight of about 800 to 8000, more preferably about 1500 to 6000. If the molecular weight is too low, then the resulting prepolymer tends to crystallize slowly resulting in a set time that may be too long. On the other hand, if the molecular weight is too high, then the viscosity of the resulting prepolymer may be too great to effectively wet the substrate to which it is applied. The preferred polyester polyols for use in the hot melt compositions of the invention should also have a hydroxyl number (milliequivalents of KOH per gram of polyester polyol) of about 15 to 100, more preferably about 18 to 60. The most preferred crystalline polyester polyols also have a hydroxyl functionality of about 2 (average number of hydroxyl groups per polymer chain).

Polyester polyols preferred for use in the hot melt compositions of the invention have linear aliphatic or slightly branched structures containing primary hydroxyl end groups, although polyester polyols containing secondary hydroxyl groups or a small percentage (not more than about 2% based on the weight of the polyester polyol) of carboxyl end groups may also be useful. Particularly preferred as polyester polyols are polyester diols which may be prepared by reacting a diol with a diacid or a diacid derivative. Especially preferred are saturated, linear, aliphatic polyester diols containing primary hydroxyl end groups and prepared by reacting saturated, linear, aliphatic diols having the general structure HO—$(CH_2)_x$—OH where x is from 2 to 8, with saturated, linear, aliphatic diacids having the general structure HOOC—$(CH_2)_y$—COOH where y is from 1 to 12. Polyester diols prepared from diols in which x is greater than 8 or diacids in which y is greater than 12 tend to crystallize very quickly and are less benefited by the inclusion of a crystalline, reactive wax.

Examples of diols useful in preparing the especially preferred polyester diols include ethylene glycol, 1,4-butanediol, 1,5-pentanediol, 1,6-hexanediol, 1,8-octanediol, and 1,10-decanediol. 1,4-butanediol and 1,6-hexanediol are the most preferred. Examples of diacids useful in preparing the especially preferred polyester diols include succinic acid, glutaric acid, adipic acid, suberic acid, azelaic acid, sebacic acid, and 1,12-dodecanedioic acid with adipic acid being the most preferred. Included within the scope of useful diacids are various diacid derivatives such as carboxylate esters (especially the methyl and ethyl esters), acid halides (such as acid chlorides), and acid anhydrides.

Another material useful as a polyester polyol is poly-ϵ-caprolactone which has the general structural formula

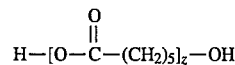

where z is $\geq 1$ and indicates the degree of polymerization. Poly-ϵ-caprolactone is typically obtained by a ring opening polymerization of ϵ-caprolactone.

Small amounts of triols, polyethers and acid anhydrides may be useful in preparing the crystalline polyester polyol although the resulting polyester polyol should still display a crystalline melting point that satisfies the criteria described above.

Examples of commercially available materials useful as crystalline polyester polyols in the hot melt compositions of the invention include some resins from the LEXOREZ series from Inolex Chemical Co. Specific examples of such resins include LEXOREZ 1130-30P, LEXOREZ 1150-30P and LEXOREZ 1151-35P. Examples of other commercially available polyester polyols useful in the hot melt compositions of the invention are some of the RUCOFLEX series of resins such as RUCOFLEX S105-30, RUCOFLEX S105-22 and RUCOFLEX S102-35 available from Ruco Polymer Corporation, and FORMREZ 66-20 from Witco Chemical Company. Examples of commercially available poly-ϵ-caprolactones that are useful in the invention include TONE 1271 and TONE 0260 from Union Carbide Corp.

Polyisocyanates which may be reacted with the crystalline polyester polyols to form the prepolymers used in the instant invention may be aliphatic or aromatic. Preferably, they are aromatic diisocyanates such as diphenylmethane-2,4'-diisocyanate and/or 4,4'-diisocyanate (MDI), or tolylene-2,4-diisocyanate and -2,6-diisocyanate and mixtures thereof (TDI). Other examples include: naphthalene-1,5-diisocyanate, triphenylmethane-4,4'4"-triisocyanate, phenylene-1,3-diisocyanate and -4,4'-diisocyanate, dimethyl-3,3'-biphenylene- 4,4'-diisocyanate, diphenylisopropylidine- 4,4'-diisocyanate, biphenylene diisocyanate, xylylene- 1,3-diisocyanate, xylylene-1,4-diisocyanate, and isophorone diisocyanate.

A list of useful commercially available polyisocyanates is found in the *Encyclopedia of Chemical Technology*, Kirk-Othmer, 3rd Ed., Vol. 13, p. 802, Interscience Pub., N.Y. (1981). The most preferred polyisocyanates are diphenylmethane-4,4'-diisocyanate, its isomers, and mixtures thereof. Polyisocyanates also include chain-extended MDI.

Isocyanate-functional derivatives of MDI and TDI may be used, such as liquid mixtures of an isocyanate-functional derivative with melting point modifiers (e.g., mixtures of MDI with polycarbodiimide adducts such as ISONATE 143L, commercially available from Dow Chemical Company). Also useful are small amounts of polymeric diphenylmethane diisocyanates, preferably 10% or less by weight of the total isocyanate components (e.g., PAPI and the PAPI 20 series, commercially available from Dow Chemical Company, the MONDUR series of isocyanates commercially available from Miles, Inc., and RUBINATE M, commercially available from ICI Chemicals, Inc.).

The hot melt compositions of the invention may further and optionally Comprise one or more other polyurethane prepolymers different from the crystalline prepolymer. The optional prepolymers may provide up to about 80% by weight of the total weight of all of the prepolymers. More preferred, however, are compositions in which the optional prepolymers are present and comprise about 30 to 55% by weight of the total weight of all of the prepolymers. Such other prepolymers comprise the reaction product of hydroxy-functional polymers and polyisocyanates. The polyisocyanates may be selected from among those useful in forming the crystalline prepolymer. Hydroxy-functional polymers useful in forming the other prepolymers include polyester polyols, polylactam polyols, polyalkylene polyols, polyalkylene ether polyols, polyacetal polyols, polyesteramide polyols, and polythioether polyols.

The other hydroxy-functional polymers may be liquid or solid at room temperature and may be either crystalline or amorphous. By "amorphous" it is meant that the hydroxy-functional polymer displays a glass transition temperature, but not a crystalline melting point, when measured by differential scanning calorimetry in the manner described previously.

Particularly useful polyester polyols may be crystalline and may be derived from linear or slightly branched structures having primary hydroxyl end groups, secondary hydroxyl groups, or carboxyl end groups. Preferred polyester polyols typically have a number average molecular weight of about 500 to 10,000, more preferably about 600 to 5000, and most preferably about 800 to 2000. Preferred polyester polyols also tend to have a hydroxyl functionality of about 2 to 5, more preferably about 2.

Most preferred as the hydroxy-functional polymer, however, are various polyether polyols that display a number average molecular weight of about 500 to 3000. Such polyether polyols may be amorphous or crystalline as well as liquid or solid at room temperature. Preferably, the polyether polyols (and, therefore the prepolymers made therefrom) have a glass transition temperature less than about 0° C. Particularly preferred are polyether polyols such as polytetramethylene ether glycol, poly(oxypropylene) glycol, polyethylene oxide, polybutylene oxide, and ethylene oxide endcapped versions of any of the foregoing. The most preferred polyether polyols are polytetramethylene ether glycol, poly(oxypropylene) glycol, and ethylene oxide endcapped poly(oxypropylene) glycol.

Examples of commercially available polyether polyols useful for forming the optional polyurethane prepolymers include the ARCOL series of poly(oxypropylene) glycols from Arco Chemical Co. such as ARCOL 1025, ARCOL 2025, and ARCOL E381, the latter being an ethylene oxide endcapped poly(oxypropylene) glycol, and various polytetramethylene ether glycols such as the TERATHANE series from E.I. dupont de Nemours & Co. (e.g., TERATHANE 1000 and TERATHANE 2000), the POLYMEG series from Q.O. Chemical Inc. (e.g., POLYMEG 2000) and the POLY-THF series available from BASF.

Optional prepolymers may be added for a variety of reasons including to improve adhesion, adjust flexibility, provide low temperature properties, enhance hydrolytic stability, and the like. The optional prepolymers should be compatible with the hot melt composition as a whole. Compatibility is evidenced by a lack of macroscopic, visible phase separation and is manifested by one or more of the following: inconsistent adhesion, inconsistent set times, poor cohesive strength, poor substrate wetting, zip, and chatter.

An essential component of the hot melt compositions of the invention is a crystalline, reactive wax. By "crystalline" it is meant that the wax displays a crystalline melting point greater than room temperature (about 20° to 22° C.) when measured by differential scanning calorimetry using a heating rate of 5° C. per minute. The peak temperature of the observed endotherm is regarded as the crystalline melting point. Preferably, the wax does not have a crystalline melting point in excess of about 150° C. so as to facilitate processing the hot melt composition.

By "reactive" it is meant that the wax includes a moiety that is reactive with a principal component of the hot melt composition, or that is reactive with any other constituent of the hot melt composition that itself is reactive with a principal component of the hot melt composition. A "principal" component of the hot melt composition is an isocyanate-terminated polyurethane prepolymer (whether it be derived from the crystalline polyester polyol or an optional hydroxy-functional material), a polyisocyanate, and selected crystalline polyester polyols. Thus, the wax typically becomes chemically bound to a principal component of the hot melt composition.

Reactive moieties include hydroxyl, carboxyl, isocyanato, thiol, amino, epoxy and vinyl groups. Carboxyl-functional and especially hydroxyl-functional waxes are particularly preferred. Some waxes inherently contain reactive moieties and may be used as such. Other waxes are nonreactive. Nonreactive waxes may be derivatized to a reactive wax by incorporating a reactive moiety therein. For example, carboxyl groups may be incorporated into nonreactive waxes by oxidizing the wax in air, with or without catalysts. Alternatively, the wax may be reacted with a polycarboxylic acid such as maleic acid at high temperature. The incorporated carboxyl groups may be further reacted or modified to provide alternative reactive moieties if desired. Nonreactive waxes may also be derivatized by grafting the reactive moiety thereto. Reactive moieties may be also incorporated into the wax through the use of reactive comonomers.

The number average molecular weight of the wax may vary over a broad range of about 50 to 10,000, more preferably about 400 to 1000. At molecular weights less than about 50 the crystalline melting point may be too low. At molecular weights greater than about 10,000 the crystalline melting point may be too high.

Waxes are frequently classified according to the source from which they are derived. Thus, waxes may be of either natural or synthetic origin and both classes are useful in the hot melt compositions of the invention provided that they are crystalline and reactive. Natural waxes include those derived from insects, animals, plants, minerals and petroleum. Petroleum waxes are conventionally subdivided into paraffin waxes and microcrystalline waxes, these inherently nonreactive waxes being obtained at different stages in the process of refining crude oil.

On the other hand, synthetic waxes are regarded as waxes because they tend to possess physical properties like natural waxes. Synthetic waxes are predominantly derived from the polymerization of hydrocarbon monomers such as ethylene, propylene, and the like and have molecular weights below 10,000. Synthetic waxes can be made by various approaches including high pressure polymerization, low pressure polymerization using Ziegler-Natta type catalysts, or the thermal degradation of high molecular weight polymers such as polyethylene and polypropylene. Synthetic waxes include polyethylene waxes, Fischer-Tropsch waxes (polymethylene waxes), and chemically modified hydrocarbon waxes (i.e., microcrystalline, polyethylene and polymethylene waxes that have been chemically modified to introduce particular properties).

Examples of crystalline, reactive waxes that are useful in the hot melt compositions of the invention include the following, all of which are available from Petrolite Corp.: the CARDIS series of carboxyl-functional, oxidized microcrystalline waxes such as CARDIS 320; various carboxyl-functional, oxidized polyethylene waxes such as C-4040, C-9500, E- 1040 and E-2020; the UNILIN series of saturated, linear primary alcohols such as UNILIN 425, UNILIN 550, UNILIN 700, UNILIN 850 and UNILIN 1000 (derived from polyethylene); the UNICID series of saturated, linear, primary carboxylic acids derived from polyethylene such as UNICID 700; and the UNITHOX series of ethoxylated, linear primary alcohols such as UNITHOX 450, UNITHOX 480, UNITHOX 550 and UNITHOX 750.

Surprisingly, the incorporation of even minor amounts of a crystalline, reactive wax dramatically reduces the set time of hot melt compositions made therewith. The wax should be used in an effective amount. That is, an amount sufficient to cause a meaningful reduction in set time (typically a set time reduction of at least about 20%) but not in an amount so great that other properties such as adhesion are materially adversely effected. If the wax content is too low, the reduction in set time may not be sufficient for the intended application or the observed set time may not be consistently reproducible. On the other hand, increasingly larger amounts of wax may provide only marginal reductions in set time. Within these parameters, the wax should provide at least about 0.005% by weight, based on the total weight of the hot melt composition, preferably about 0.01 to 5% by weight, and most preferably about 0.05 to 1% by weight. Additionally, the reactive waxes used in the hot melt compositions of the invention are relatively low cost materials thereby permitting the manufacture of an economical hot melt composition.

While not wishing to be bound to any particular theory, it is believed that the reactive wax serves as a nucleating agent to increase the rate of crystallization of the polyurethane prepolymer derived from the crystalline polyester polyol. Thus, the wax should be used in an amount effective to promote rapid crystallization of the crystalline prepolymer. Waxes useful in the hot melt compositions of the invention are highly incompatible with other components of the hot melt composition. The incompatibility of the wax enables it to nucleate the crystallization of the crystalline prepolymer. However, since the reactive wax typically becomes chemically bound to a principal component of the hot melt composition, its incompatibility does not promote macroscopic phase separation from the other components of the hot melt composition that might otherwise occur.

Toward these goals, waxes useful in the hot melt compositions of the invention should be primarily hydrocarbon in nature, preferably containing at least 85% by weight hydrogen and carbon, more preferably at least 90% by weight, and most preferably at least 95% by weight hydrogen and carbon. If the hydrocarbon content of the wax is too low, then the wax becomes increasingly compatible with the hot melt composition, less effective as a nucleating agent, and less effective in reducing the set time of hot melt compositions made therewith. Thus, while useful waxes may contain a small percentage of heteroatoms such as oxygen, nitrogen, and sulfur, the waxes do not tend to include regularly repeating moieties that contain such heteroatoms such as ester groups and amine groups.

Crystalline, reactive waxes are also believed to be extremely effective in reducing the set time of hot melt compositions made therewith because the waxes themselves rapidly crystallize. To be effective, it is believed that the wax should crystallize more quickly than the crystalline prepolymer and that it should be the most rapidly crystallizing component of the hot melt composition. By crystallizing faster than other components of the hot melt composition, it is meant that as the molten hot melt composition cools following application to a substrate, the wax-containing component will solidify at a higher temperature and, therefore, sooner than the other components of the system. The solidification temperature of the various components of the hot melt composition may be determined individually by differential scanning calorimetry by cooling the molten material at the rate of 5° C. per minute and recording the peak temperature of the observed exotherm as the solidification temperature.

Various other ingredients or adjuvants may be optionally added to the hot melt compositions of the invention to impart to or to modify a particular characteristic of the ultimate composition. Such ingredients should be added at a level that does not materially interfere with the set time of the composition or other important properties such as adhesion. Particular ingredients which may be added include chain extension agents (e.g., short chain hydroxy-functional monomers such as polyethylene glycol or butane diol); fillers (e.g., carbon black; glass, ceramic, metal, or plastic bubbles; metal oxides such as zinc oxides; and minerals such as talc, clay, silica, silicates and the like); thermoplastic resins; plasticizers; tackifiers; antioxidants; pigments; U.V. absorbers; and adhesion promoters such as silanes and the like. Such ingredients typically do not comprise more than about 50 wt. % of the total weight of the hot melt composition. The particular amount of any specific class of ingredients will depend in part on its function. Thus, while fillers might account for up to about 50 wt. % of the hot melt composition, a silane adhesion promoter might account for about 0.5 wt. % of the hot melt composition. Chain extension agents typically provide less than about 10 wt. %.

In addition, the compositions of the invention may include an effective amount of a catalyst or reaction accelerator such as tertiary amines, metal-organic compounds, and the like. An effective amount of a catalyst is preferably from about 0.01 to 2% by weight, based on the total weight of the hot melt composition. More preferably, the catalyst is present at a level of about 0.05 to about 0.5% by weight.

The hot melt compositions of the invention may be readily manufactured using conventional production techniques. Various constituents of the hot melt composition may be added to a suitable reaction system either sequentially or in a one-shot procedure. The order of addition may be influenced by a desire to chemically bind the wax to a particular component of the hot melt composition. Of course, waxes bearing certain reactive moieties will react selectively with only certain components of the system. The wax may be reacted with a principal component of the hot melt composition (i.e., an isocyanate-terminated polyurethane prepolymer, a polyisocyanate, and selected crystalline polyester polyols), or any constituent of the hot melt composition that reacts with a principal component of the hot melt composition. Typically, the polyurethane prepolymer (usually the crystalline prepolymer) is prepared in advance and the wax is then reacted therewith. The components are usually mixed at an elevated temperature of about 100° to 150° C.

The isocyanate equivalents should be present in the reaction mixture in an amount greater than that of the hydroxyl equivalents. The equivalent ratio of isocyanate to hydroxyl equivalents (sometimes referred to hereinafter as the isocyanate index) is preferably from about 1.1:1 to 10:1, and most preferably from about 1.2:1 to 2.2:1.

The hot melt compositions of the invention achieve their initial strength or green strength through solidification (i.e., crystallization) upon cooling, and then cure to a thermoset, infusible high ultimate strength adhesive bond by reaction with water such as water vapor or moisture. High humidity and heat will provide an accelerated rate of cure while low humidity (e.g., 15% relative humidity or less) will provide a slower rate of cure.

The invention will be more fully understood with reference to the following nonlimiting examples. In the examples, the polyester polyols and other hydroxy-functional polymers used to prepare the prepolymers are reported in parts (i.e., parts by weight), wherein their combined, total contribution is 100 parts. The amount of polyisocyanate is given with reference to the isocyanate index in which the number of OH equivalents includes all hydroxy-functional materials used to prepare the hot melt composition, exclusive of any hydroxy-functional wax. The wax and catalyst amounts are given in weight % (wt. %) based on the total weight of the hot melt composition. Unless otherwise noted, parts are reported to the nearest whole number, isocyanate indices are reported to two places following the decimal point, and weight % values are reported to one significant digit following the decimal point.

Table 1 identifies various hydroxy-functional polymers used to prepare the different polyurethane prepolymers employed in the following examples.

TABLE 1

| Trade Name | Supplier | Hydroxy-functional polymer |
| --- | --- | --- |
| ARCOL PPG-1025 | Arco Chemical Co. | Poly(oxypropylene) glycol |
| ARCOL PPG-2025 | Arco Chemical Co. | Poly(oxypropylene) glycol |
| DYNACOLL 7380 | Hüls America | Polyhexamethylene dodecanedioate |
| DYNACOLL RP-7111 | Hüls America | Amorphous polyester, hydroxyl # = 32, molecular weight = 3507 |
| FORMREZ 66-20 | Witco Chemical Co. | Polyhexamethylene adipate |
| LEXOREZ 1130-30P | Inolex Chemical Co. | Polyhexamethylene adipate |
| RUCOFLEX S102-35 | Ruco Polymer Corp. | Polybutylene adipate |
| RUCOFLEX S105-22 | Ruco Polymer Corp. | Polyhexamethylene adipate |
| RUCOFLEX S105-30 | Ruco Polymer Corp. | Polyhexamethylene adipate |
| TERATHANE 1000 | DuPont[1] | Polytetramethylene ether glycol |
| TERATHANE 2000 | DuPont[1] | Polytetramethylene ether glycol |

[1] E.I. duPont de Nemours & Co.

Table 2 identifies the various waxes used in preparing the following examples. Each wax is available from Petrolite Corp., except for AC 405T, which is available from Allied Signal.

TABLE 2

| Trade Name | Description |
| --- | --- |
| AC 405T | Ethylene vinyl acetate copolymer wax |
| BESQUARE 195 | Microcrystalline wax |
| CARDIS 320 | Oxidized microcrystalline wax |
| CP 7 | Ethylene/propylene copolymer wax |
| PETROLITE E-1040 | Oxidized polyethylene wax |
| PETROLITE E-2020 | Oxidized polyethylene wax |
| POLYWAX 500 | Polyethylene wax |
| POLYWAX 655 | Polyethylene wax |
| POLYWAX 850 | Polyethylene wax |
| POLYWAX 1000 | Polyethylene wax |
| UNICID 700 | C50 carboxylic acid wax |
| UNILIN 425 | C30 saturated linear alcohol wax |
| UNILIN 550 | C40 saturated linear alcohol wax |
| UNILIN 700 | C50 saturated linear alcohol wax |
| UNILIN 850 | C > 50 saturated linear alcohol wax |
| UNILIN 1000 | C > 50 saturated linear alcohol wax |
| UNITHOX 450 | Ethyoxylated linear alcohol wax |

Test Method For Determining Set Time

Set time was measured as follows. A 0.5±0.05 g quantity of the hot melt composition to be tested was extruded at about 121° C. onto the center portion (about 5 cm from each end) of a 2.5 cm wide×10 cm long×0.8 cm thick piece of fir having one side smooth (obtained from Martin Lumber, St. Paul, Minn.). A timer was started. After 10 seconds, a second piece of fir was bonded on its center point and at right angles to the first piece. Firm hand pressure was used to mate the surfaces and squeeze excess composition from the bond line.

A 2.27 kg tensile load was applied to the 6.45 sq. cm bond area. If the bond could not support the load for 120 seconds (i.e., the timer reading minus 10 seconds), the procedure was repeated with new bonded samples tested at longer times until a bond could support the load for 120 seconds. The set time was recorded as the shortest time interval required for the bond to support the 2.27 kg load for 120 seconds. Longer elapsed times indicate slower set times. Values reported are the average of a range of set times observed. Testing was continued until two consecutive samples displayed the same set time.

EXAMPLES 1 TO 8 AND COMPARATIVE EXAMPLES 1 AND 2

4,4'-diphenylmethane diisocyanate (MDI) was added at an isocyanate index of 1.69 to a 600 ml stainless steel reactor fitted with a gas inlet adapter and a cover having a rubber gasket, a gas inlet, a stirrer opening, and a stirring rod. The MDI was heated to about 120° C. and melted with efficient stirring under a nitrogen blanket. After the MDI melted, 40 parts TERATHANE 2000 (polytetramethylene ether glycol) were added to the reactor. The mixture was stirred under nitrogen for about 15 minutes. Then 60 parts of RUCOFLEX S105-22 (crystalline polyhexamethylene adipate) were added with stirring, and heating was continued for about 15 minutes. Except as shown in Table 3 below, a wax was then added and stirred until well mixed and reacted. The wax was added at two different levels: 0.1% by weight and 1.0% by weight. This was followed by 0.2% by weight of 4,4'-(oxydi-2,1-ethanediyl)bismorpholine catalyst (TEXACAT DMDEE, Texaco Chemical Co.). Stirring was continued under vacuum for about 1 hour. Heating at about 120° C. was maintained throughout. The resulting mixtures were poured into nitrogen-purged metal containers that were then sealed. The hot melt compositions were then tested for set time with the results reported in Table 3.

TABLE 3

| Example | Wax | Set Time (Seconds) 0.1% by weight wax | 1.0% by weight wax |
|---|---|---|---|
| 1 | UNILIN 425 | 43 | 65 |
| 2 | UNILIN 550 | 40 | 38 |
| 3 | UNILIN 700 | 23 | 33 |
| 4 | UNILIN 1000 | 18 | 20 |
| 5 | UNICID 700 | 45 | 55 |
| 6 | UNITHOX 450 | 55 | 75 |
| 7 | PETROLITE E-1040 | 38 | 55 |
| 8 | CARDIS 320 | 45 | 95 |
| C.E.1 | NONE ADDED | 85 (no wax) | |
| C.E.2 | BESQUARE 195 | 85 | 145 |

Examples 1 to 8 and comparative examples (C.E.) 1 and 2 demonstrate the surprising and unexpectedly dramatic reduction in set time that occurs when 0.1% by weight of a crystalline, reactive wax (examples 1 to 8) is added to a wax-free hot melt composition (C.E. 1). Set time reductions of 35% to 79% were observed. The addition of 0.1% by weight of a crystalline, nonreactive microcrystalline wax (C.E. 2) had no effect on set time. The addition of 1.0% by weight of a wax in some compositions further decreased set time (example 2) or only slightly increased it (example 4). For other compositions, the increase in set time was more significant. These examples show the desirability of using small amounts (most preferably not more than 1% by weight) of a crystalline, reactive wax.

COMPARATIVE EXAMPLES 3 TO 10

A series of hot melt compositions was prepared as described in conjunction with examples 1 to 8 except that the isocyanate index was 1.80 and the wax addition level was 0.1% by weight. The wax used and the set time of the hot melt compositions are reported below in Table 4. In each comparative example, the wax was crystalline but nonreactive.

TABLE 4

| Example | Wax | Set Time (Seconds) |
|---|---|---|
| C.E.3 | NONE ADDED | 85 |
| C.E.4 | BESQUARE 195 | 85 |
| C.E.5 | POLYWAX 500 | 65 gradually increased to 85 |
| C.E.6 | POLYWAX 655 | 50 gradually increased to 85 |
| C.E.7 | POLYWAX 850 | 43 gradually increased to 85 |
| C.E.8 | POLYWAX 1000 | 30 gradually increased to 85 |
| C.E.9 | CP 7 | 48 gradually increased to 85 |
| C.E.10 | AC 405T | 75 |

These examples show that a small amount of a crystalline, nonreactive wax does not appreciably decrease the set time of a hot melt composition made therewith or does not result in a hot melt composition having a sustained, reduced set time. In the case of comparative examples 5 to 9, the set time actually increased as the hot melt composition aged. That is, the bonds in a series that were tested last demonstrated longer set times than those that were tested first. The absence of a reactive moiety in these waxes promoted rapid macroscopic phase separation of the wax from the remainder of the hot melt composition.

EXAMPLES 9 TO 11 AND COMPARATIVE EXAMPLE 11

A series of hot melt compositions was prepared as described in conjunction with examples 1 to 8 except using 55 parts of ARCOL PPG-1025, a poly(oxypropylene) glycol, to replace the polytetramethylene ether glycol, and 45 parts of the same polyhexamethylene adipate. The isocyanate index of each example was 1.40. The wax used (0.1% by weight) in each example and the set time of the resulting hot melt compositions are reported below in Table 5.

TABLE 5

| Example | Wax | Set Time (seconds) |
|---|---|---|
| 9 | UNILIN 700 | 47 |
| 10 | UNILIN 850 | 42 |
| 11 | UNICID 700 | 57 |
| C.E. 11 | NONE ADDED | 95 |

Adding 0.1% by weight of a crystalline, reactive wax resulted in a dramatic set time reduction of up to 56%.

EXAMPLE 12 AND COMPARATIVE EXAMPLE 12

Two hot melt compositions were prepared as described in conjunction with examples 1 to 8 except using 100 parts by weight of a crystalline polybutylene adipate (RUCOFLEX S102-35) to replace both the polytetramethylene ether glycol and the polyhexamethylene adipate. 0.1% by weight of UNILIN 700 wax was added to example 12 but not comparative example 12. The isocyanate index was 1.70 for each example. The set time of comparative example 12 was 190 seconds; the set time of example 12 was 150 seconds, a reduction of 21%.

EXAMPLES 13 AND 14 AND COMPARATIVE EXAMPLE 13

Three hot melt compositions were prepared as described in conjunction with examples 1 to 8 except using 30 parts TERATHANE 1000 (polytetramethylene ether glycol)instead of TERATHANE 2000 and 70 parts RUCOFLEX S102-35 (a crystalline polybutylene adipate) instead of RUCOFLEX S105-22. The isocyanate index was 1.70 for all examples. The wax (0.1% by weight) was varied as shown below in Table 6 along with the set time test results.

TABLE 6

| Example | Wax | Set Time (seconds) |
|---|---|---|
| 13 | UNILIN 700 | 240 |
| 14 | UNICID 700 | 270 |
| C.E. 13 | NONE ADDED | 405 |

The addition of a mere 0.1% of a crystalline, reactive wax to the hot melt composition of comparative example 13 resulted in a surprising set time reduction of up to 41%.

EXAMPLE 15 AND COMPARATIVE EXAMPLE 14

These examples describe the preparation of hot melt compositions in which the crystalline, reactive wax is reacted with the crystalline polyester polyol prior to the formation of a polyurethane prepolymer.

More specifically, for example 15, RUCOFLEX S105-22 (a crystalline polyhexamethylene adipate polyester diol) was added to a 3-neck resin flask fitted with a thermometer, a gas inlet, and a stirring rod. The polyester diol was heated to about 121° C. and melted with efficient stirring under vacuum for about 2 hours. 0.3% by weight of a crystalline, reactive wax (UNICID 700) was added to the resin flask and the mixture was stirred at about 121° C. until the melt went from cloudy to clear, indicating completion of the reaction between the wax and the polyester diol. The resulting wax-reacted polyester diol was poured into a 1.9 liter container for storage.

4,4'-diphenylmethane diisocyanate (MDI) was added at an isocyanate index of 2.00 to a 600 ml stainless steel reactor fitted with a gas inlet adapter and a cover having a rubber gasket, a gas inlet, a stirrer opening, and a stirring rod. The MDI was heated to about 120° C. and melted with efficient stirring under a nitrogen blanket. After the MDI melted, the previously prepared wax-reacted polyester diol was added to the reactor with stirring and heating until well mixed. This was followed by 0.2% by weight of 4,4'-(oxydi-2,1-ethanediyl)bismorpholine catalyst (TEXACAT DMDEE, Texaco Chemical Co.). Stirring was continued under vacuum for about 1 hour. Heating at about 120° C. was maintained throughout. The resulting mixture was poured into nitrogen-purged metal containers that were then sealed.

Comparative example 14 was prepared in a like manner but without a wax. Example 15 displayed a set time of 23 seconds as compared to 33 seconds for comparative example 14, a set time reduction of about 30%.

EXAMPLES 16 AND 17 AND COMPARATIVE EXAMPLE 15

A series of hot melt compositions was prepared as described in conjunction with example 15 except using a different crystalline polyhexamethylene adipate (RUCOFLEX S105-30) and the crystalline, reactive waxes shown below in Table 7. Also reported in Table 7 are the set times for these compositions.

TABLE 7

| Example | Wax | Set Time (seconds) |
|---------|-----|--------------------|
| 16 | PETROLITE E-2020 | 22 |
| 17 | UNICID 700 | 27 |
| C.E. 15 | NONE ADDED | 47 |

These examples along with example 15 and comparative example 14 show that small amounts of carboxy-functional oxidized polyethylene wax, and a saturated linear aliphatic carboxylic acid wax, when first reacted with a crystalline polyester diol based on polyhexamethylene adipate, are all effective in reducing the set time of a hot melt composition made therewith. Set time reductions of as much as 53% were observed. Parallel examples prepared using crystalline polybutylene adipate did not show similar results.

EXAMPLE 18

Example 18 was prepared as described in conjunction with examples 1 to 8 except using 100 parts RUCOFLEX S105-30 (crystalline polyhexamethylene adipate) in place of both the TERATHANE 2000 and the RUCOFLEX S105-22, 0.3 wt. % UNILIN 700 crystalline, reactive wax, and an isocyanate index of 2.00. The set time of example 18 was 27 seconds while the set time of comparative example 15 above was 47 seconds, a reduction of 43%.

EXAMPLE 19 AND COMPARATIVE EXAMPLE 16

Two hot melt compositions were prepared as described in conjunction with examples 1 to 8 except using 100 parts of a crystalline polyhexamethylene adipate (LEXOREZ 1130-30P) to replace both the polytetramethylene ether glycol and the RUCOFLEX S105- 22. The isocyanate index was 2.00 for all examples. 1.5% by weight of UNILIN 550, a crystalline, reactive wax was added to example 19 but not comparative example 16. The set time of comparative example 16 was 80 seconds; the set time of example 19 was 55 seconds, a reduction of 31%.

EXAMPLE 20 AND COMPARATIVE EXAMPLE 17

Two hot melt compositions were prepared as described in conjunction with examples 1 to 8 except using 45 parts of a different crystalline polyhexamethylene adipate (FORMREZ 66-20) to replace the RUCOFLEX S105-22 and 55 parts of a poly(oxypropylene) glycol (ARCOL PPG-1025) to replace the polytetramethylene ether glycol. The isocyanate index was 1.40. 0.1% by weight of UNILIN 700, a crystalline, reactive wax, was added to example 20 but not comparative example 17. The set time of comparative example 17 was 95 seconds; the set time of example 20 was 30 seconds, a reduction of 68%.

EXAMPLES 21 AND 22

In these examples, the order of addition of the components was examined for its effect on the resultant compositions. The hot melt compositions were prepared as described in conjunction with examples 1 to 8 except using 50 parts of a crystalline polyhexamethylene adipate (RUCOFLEX S105-30), 50 parts of a crystalline polybutylene adipate (RUCOFLEX S102-35), and 0.1% by weight of a crystalline, reactive wax (UNILIN 700). The isocyanate index of each example was 2.00.

In example 21 the sequential order of addition of the components to the reactor was: MDI, polyhexamethylene adipate, wax, and polybutylene adipate. In example 22, the sequential order of addition of the components to the reactor was: MDI, polybutylene adipate, wax, and polyhexamethylene adipate. The set time of example 21 was 43 seconds; the set time of example 22 was 48 seconds. Varying the order of addition of the reactive ingredients did not significantly affect the set time of the resultant hot melt composition.

EXAMPLES 23 AND 24

In these examples, the order of addition of the components was examined for its effect on the resultant compositions. The hot melt compositions were prepared as described in conjunction with examples 21 and 22 except using 60 parts RUCOFLEX S105-30, 40 parts of a polytetramethylene ether glycol (TERATHANE 2000), and 0.1% by weight of UNILIN 700 wax. The isocyanate index was 1.80 for both examples. When the RUCOFLEX S105-30 was added to the MDI first, followed by the wax and then the TERATHANE 2000, the set time was 43 seconds. When the TERATHANE 2000 was added to the MDI, followed by the wax and then the RUCOFLEX S105-30, the set time was 43 seconds. The order of addition of the components did not affect the set time of the resulting hot melt compositions.

EXAMPLES 25 TO 27 AND COMPARATIVE EXAMPLES 18 TO 20

Two hot melt compositions were prepared as described in conjunction with examples 1 to 8 except using 98 parts of a different crystalline polyhexamethylene adipate (RUCOFLEX S105-30) to replace the RUCOFLEX S105-22 and 2 parts of DYNACOLL 7380 (polyhexamethylene dodecanedioate, a rapidly crystallizing polyester polyol) to replace the polytetramethylene ether glycol. The isocyanate index was 2.00 for both examples. 0.1% by weight of UNILIN 700, a crystalline, reactive wax, was added to example 25 but not comparative example 18. The set time of comparative example 18 was 30 seconds; the set time of example 25 was 13 seconds, a reduction of 57%. These examples show that adding a small amount of a crystalline, reactive wax to a hot melt composition that already contains a rapidly crystallizing polyester polyol further reduces the set time. Thus, the wax acts as a nucleating agent even in the presence of the rapidly crystallizing polyester.

A second set of examples was prepared as described above except that 0.1 part DYNACOLL 7380 and 99.9 parts of RUCOFLEX S105-30 were used. The set time of comparative example 19 (i.e., without wax) was 42 seconds; the set time of example 26 with 0.1% by weight of the wax was 20 seconds, a reduction of 52%. Adding only 0.1 part of DYNACOLL 7380 rather than 2 parts caused the set time to increase (comparative example 18 vs. comparative example 19).

A third set of examples was prepared as above except containing no DYNACOLL 7380 so as to yield a composition based on RUCOFLEX S105-30 alone. The set time of comparative example 20 (i.e., without wax) was 47 seconds; the set time of example 27 with 0.1% by weight of the wax was 27 seconds, a reduction of 43%.

The use of wax alone (example 27) resulted in a set time reduction greater than that when polyhexamethylene dodecanedioate was used alone (comparative example 19).

EXAMPLES 28 AND 29

Two hot melt compositions were prepared as described in conjunction with examples 1 to 8 except using a different crystalline polyhexamethylene adipate (LEXOREZ 1130-30P) to replace both the polytetramethylene ether glycol and the RUCOFLEX S105- 22. The isocyanate index was 2.00. 1.9% by weight of UNILIN 700 crystalline, reactive wax was added to example 28. The set time of example 28 was 43 seconds.

In example 29 the isocyanate index was 1.84 and 1.5% by weight of UNILIN 550 crystalline, reactive wax was used in place of UNILIN 700. The set time of example 29 was 55 seconds.

EXAMPLES 30 TO 39 AND COMPARATIVE EXAMPLES 21 AND 22

A series of hot melt compositions was prepared as described in conjunction with examples 1 to 8 except that the isocyanate index was 2.00. From 0.005 to 5% by weight of crystalline, reactive UNILIN 700 wax was added to examples 30 to 39 but no wax was added to comparative examples 21 and 22. The amount of wax and the set time for each example are reported in Table 8.

TABLE 8

| Example | Amount of Wax (wt. %) | Set Time (Seconds) |
| --- | --- | --- |
| C.E. 21 | None added | 88 |
| C.E. 22 | None added | 115 |
| 30 | 0.005 | 88 |
| 31 | 0.01 | 78 |
| 32 | 0.03 | 73 |
| 33 | 0.05 | 56 |
| 34 | 0.1 | 49 |
| 35 | 0.3 | 29 |
| 36 | 0.5 | 31 |
| 37 | 1.0 | 54 |
| 38 | 2.5 | 56 |
| 39 | 5.0 | 59 |

The two comparative examples demonstrate that the set time of identical wax-free hot melt compositions can vary and may be affected by factors other than the formulation of the compositions. The remaining examples show that as little as 0.005 wt. % of a crystalline, reactive wax can result in a set time reduction of about 23%. At wax levels above 1.0%, the beneficial effect on set time reduction begins to taper off. Accordingly, the hot melt compositions of the invention comprise at least about 0.005 wt. % of a crystalline, reactive wax, more preferably about 0.01 to 5 wt. %, and most preferably about 0.1 to 1 wt. %.

EXAMPLE 40 AND COMPARATIVE EXAMPLE 23

Two hot melt compositions were prepared as described in conjunction with examples 1 to 8 except adding to the reactor the following components in the following order: 45 parts of RUCOFLEX S105-22 crystalline polyhexamethylene adipate, 27.5 parts of ARCOL PPG-1025 poly(oxypropylene) glycol, and 27.5 parts of ARCOL PPG-2025 poly(oxypropylene) glycol. The NCO index for each example was 1.30. Example 40 with 0.1 wt. % of UNILIN 700 wax (added last) demonstrated a set time of 43 seconds, a set time reduction of about 66% over comparative example 23 (125 seconds) having no wax. These examples show that hot melt compositions according to the invention can include more than two prepolymers.

COMPARATIVE EXAMPLES 24 AND 25

Two hot melt compositions were prepared as described in conjunction with examples 1 to 8 except using 50 parts of an amorphous polyester polyol (DYNACOLL RP-7111) to replace the polyhexamethylene adipate and 50 parts of a different polytetramethylene ether glycol (TERATHANE 1000) to replace the TERATHANE 2000. The isocyanate index for both examples was 2.00. 0.1% by weight of UNILIN 700 wax was added to comparative example 22 but not comparative example 23. The set time of both comparative examples was greater than 20 minutes. These data show that adding wax to a composition that does not contain a crystalline polyester prepolymer has no effect on the set time of the composition.

COMPARATIVE EXAMPLES 26 AND 27

Two hot melt compositions were prepared as described in conjunction with examples 1 to 8 except using 0.1% by weight of a solid, nonreactive, essentially amorphous aromatic/aliphatic tackifier (PICCOTAC HM 2162, commercially available from Hercules, Inc.) in comparative example 26, and 0.1% by weight of a liquid, amorphous, nonreactive plasticizer (SANTICIZER 160, commercially available from Monsanto, Colo.) in comparative example 27 to replace the wax. The isocyanate index was 1.80 for the two comparative examples. The set time of comparative example 26 was 130 seconds, and the set time of comparative example 27 was 150 seconds. The set time of comparative example 1, described previously and containing neither wax, plasticizer nor tackifier, was 85 seconds. These data show that adding small amounts of tackifiers or plasticizers cause the set time to increase over compositions having no plasticizer or tackifier. These data further illustrate that the waxes used in the hot melt compositions of the invention are uniquely distinct from tackifiers and plasticizers in their ability to reduce the set time of hot melt compositions made therewith.

Various modifications are possible within the scope of the foregoing specification without departing from the spirit of the invention which is defined in the accompanying claims.

The embodiments for which an exclusive property or privilege is claimed are defined as follows:

1. A moisture curable hot melt composition comprising:
   (a) a first isocyanate-terminated polyurethane prepolymer that is the reaction product of a crystalline polyester polyol and a polyisocyanate;
   (b) a crystalline, reactive wax; and
   (c) optionally, a second isocyanate-terminated polyurethane prepolymer that is the reaction product of a polyisocyanate and a hydroxy-functional polymer that is different than the crystalline polyester polyol.

2. A moisture curable hot melt composition according to claim 1 wherein the crystalline polyester polyol has a crystalline melting point of about 30° to 110° C.

3. A moisture curable hot melt composition according to claim 1 wherein the crystalline polyester polyol has a number average molecular weight of about 800 to 8000.

4. A moisture curable hot melt composition according to claim 1 wherein the crystalline polyester polyol is the reaction product of a diol having the structure HO—$(CH_2)_x$—OH wherein the value of x is 2 to 8 and a diacid having the structure HOOC—$(CH_2)_y$—COOH wherein the value of y is 1 to 12.

5. A moisture curable hot melt composition according to claim 1 wherein the crystalline polyester polyol is poly-$\epsilon$-caprolactone.

6. A moisture curable hot melt composition according to claim 1 wherein the wax includes a reactive moiety selected from the group consisting of hydroxyl, carboxyl, isocyanato, thiol, amino, epoxy, and vinyl.

7. A moisture curable hot melt composition according to claim 6 wherein the reactive moiety is a carboxyl group or a hydroxyl group.

8. A moisture curable hot melt composition according to claim 1 wherein the wax has a number average molecular weight of about 50 to 10,000.

9. A moisture curable hot melt composition according to claim 1 wherein the wax comprises at least about 0.005% by weight, based on the total weight of the hot melt composition.

10. A moisture curable hot melt composition according to claim 9 wherein the wax comprises about 0.01 to 5% by weight, based on the total weight of the hot melt composition.

11. A moisture curable hot melt composition according to claim 10 wherein the wax comprises about 0.05 to 1% by weight, based on the total weight of the hot melt composition.

12. A moisture curable hot melt composition according to claim 1 wherein the second isocyanate-terminated polyurethane prepolymer is present.

13. A moisture curable hot melt composition according to claim 12 wherein the hydroxy-functional polymer of the second prepolymer is a polyether polyol.

14. A moisture curable hot melt composition according to claim 13 wherein the polyether polyol is selected from the group consisting of polytetramethylene ether glycol, poly(oxypropylene) glycol, and ethylene oxide endcapped poly(oxypropylene) glycol.

15. A moisture curable hot melt composition according to claim 1, that has a set time that is at least about 20% less than the set time of the same hot melt composition but which does not include the crystalline, reactive wax.

16. A moisture curable hot melt composition according to claim 1 wherein the wax nucleates the crystallization of the first isocyanate-terminated polyurethane prepolymer without macroscopically phase separating from the other components of the hot melt composition.

17. A moisture curable hot melt composition according to claim 1 wherein the wax is the most rapidly crystallizing component of the hot melt composition.

18. A bonded composite comprising a first substrate, a second substrate, and a layer of the hot melt composition of claim 1 therebetween, wherein the hot melt composition has been moisture cured and adhesively bonds the first and second substrates together.

19. A moisture curable hot melt composition comprising:
   (a) a first isocyanate-terminated polyurethane prepolymer that is the reaction product of:
      (i) a crystalline polyester diol obtained by reacting a diol having the structure HO—$(CH_2)_x$—OH wherein x= 2 to 8 and a diacid having the structure HOOC—$(CH_2)_y$—COOH wherein y= 1 to 12, and
      (ii) diphenylmethane diisocyanate;
   (b) 0.01 to 5% by weight, based on the total weight of the hot melt composition, of a crystalline, reactive wax that includes a hydroxyl or a carboxyl group; and
   (c) a second isocyanate-terminated polyurethane prepolymer that is the reaction product of a polyether polyol and diphenylmethane diisocyanate.

20. A moisture curable hot melt composition according to claim 19 wherein the wax comprises about 0.05 to 1% by weight, based on the total weight of the hot melt composition.

21. A moisture curable hot melt composition according to claim 19 wherein the crystalline polyester diol is polyhexamethylene adipate.

22. A moisture curable hot melt composition according to claim 21 wherein the polyether polyol is selected from the group consisting of polytetramethylene ether glycol, poly(oxypropylene) glycol, and ethylene oxide endcapped poly(oxypropylene) glycol.

23. A moisture curable hot melt composition according to claim 22 further comprising a third isocyanate-terminated polyurethane prepolymer that is the reaction product of a polyether polyol and diphenylmethane diisocyanate wherein the polyether polyol of the third prepolymer is selected from the group consisting of polytetramethylene ether glycol, poly(oxypropylene) glycol, and ethylene oxide endcapped poly(oxypropylene) glycol.

24. A method of reducing the set time of a moisture curable hot melt composition that includes a polyurethane prepolymer that comprises the reaction product of a polyisocyanate and a crystalline polyester polyol, the method comprising the step of adding to the hot melt composition an effective amount of a crystalline, reactive wax.

25. A method according to claim 24 wherein the wax comprises at least about 0.005% by weight, based on the total weight of the hot melt composition.

26. A method according to claim 25 wherein the wax comprises about 0.01 to 5% by weight, based on the total weight of the hot melt composition.

27. A method according to claim 26 wherein the wax comprises about 0.05 to 1% by weight, based on the total weight of the hot melt composition.

28. A moisture curable hot melt composition according to claim 1 wherein the crystalline, reactive wax is incompatible with the first isocyanate-terminated polyurethane propolymer and, if present, the second isocyanate-terminated polyurethane propolymer.

* * * * *